United States Patent [19]

Sakaguchi

[11] Patent Number: 5,247,409
[45] Date of Patent: Sep. 21, 1993

[54] DISK DRIVE PIN SUPPORT MECHANISM IN A ROTATING DISK DATA STORAGE APPARATUS

[75] Inventor: Takahiro Sakaguchi, Kodaira, Japan

[73] Assignee: TEAC Corporation, Tokyo, Japan

[21] Appl. No.: 782,074

[22] Filed: Oct. 24, 1991

[30] Foreign Application Priority Data

Oct. 26, 1990 [JP] Japan .............................. 2-112824[U]
Nov. 22, 1990 [JP] Japan .............................. 2-122793[U]

[51] Int. Cl.⁵ ................................................ G11B 17/02
[52] U.S. Cl. .................................. 360/99.08; 360/99.04
[58] Field of Search ........................... 360/99.08, 99.04

[56] References Cited

U.S. PATENT DOCUMENTS

| | | | |
|---|---|---|---|
| 4,445,157 | 4/1984 | Takahashi | 360/133 |
| 4,758,915 | 7/1988 | Sakaguchi | 360/97 |
| 4,989,107 | 1/1991 | Tsukahara | 360/99.08 |
| 5,010,427 | 4/1991 | Taguchi et al. | 360/99.08 |
| 5,103,358 | 4/1992 | Munekata | 360/99.04 |

FOREIGN PATENT DOCUMENTS 62-106347 7/1987 Japan .

Primary Examiner—Edward P. Westin
Assistant Examiner—T. Davenport
Attorney, Agent, or Firm—Woodcock Washburn Kurtz Mackiewicz & Norris

[57] ABSTRACT

A disk drive for use with a flexible magnetic disk having a sheet metal hub having a central hole and an eccentric slot formed therein. The disk drive has a turntable on which the disk is to be placed for joint rotation therewith. The turntable has a spindle disposed centrally for centering engagement in the central hole in the disk, and a drive pin disposed eccentrically on the turntable for driving engagement in the eccentric slot. Erected on the free end of a lever pivotally mounted to the turntable, the drive pin is movable substantially radially of the turntable. A magnetic member is also mounted to the free end of the lever for magnetically biasing the drive pin radially outwardly of the turntable so that the disk may be engaged by the spindle and the drive pin without looseness. For magnetically biasing the drive pin there is utilized a permanent magnet rotor which constitutes a part of a disk drive motor and which is mounted to the turntable for joint rotation therewith.

12 Claims, 4 Drawing Sheets

DISK DRIVE PIN SUPPORT MECHANISM IN A ROTATING DISK DATA STORAGE APPARATUS

BACKGROUND OF THE INVENTION

My invention relates to an apparatus for the transfer (reading and/or writing) of data with rotating data storage disks typically including a flexible magnetic disk. More particularly, my invention pertains to such a rotating disk data storage apparatus of the kind having a drive pin movably supported in an eccentric position on a turntable for driving engagement in a slot or opening in a metal made hub of the disk. Still more particularly, my invention deals with an improved support mechanism for the drive pin on the turntable.

The three and a half inch flexible magnetic disk is known (FIGS. 1 and 2) which has a sheet metal hub attached centrally thereto, as described and claimed by U.S. Pat. No. 4,445,157 to Takahashi. The hub has formed therein a central opening of square shape and an eccentric opening of rectangular shape. When loaded in the associated apparatus, or disk drive according to common parlance, the disk has its central hub placed upon a turntable of much smaller diameter than that of the disk. The turntable has a permanent magnet for attracting the disk hub. Erected centrally on the turntable, a spindle engages in the central opening in the disk hub for centering the disk with respect to the turntable. Further a drive pin is disposed eccentrically on the turntable for driving engagement in the eccentric slot in the disk hub, imparting the rotation of the turntable to the disk.

I know two conventional approaches to the problem of how to support the eccentric drive pin on the turntable. One employs a cantilever spring support for the drive pin, as described and claimed by U.S. Pat. No. 4,758,915 to Sakaguchi, which is assigned to the assignee of the instant application. The other uses a spring biased lever, as disclosed in Japanese Unexamined Utility Model Publication No. 62-106347.

According to the cantilever spring approach, the drive pin is mounted directly on the spring for displacement both in an upstream direction of the turntable with respect to its predetermined direction of rotation and in a direction parallel to the axis of the turntable. The slanting attitude of the drive pin is intended to maintain the disk in correct angular relationship to the turntable, whereas the drive pin displacement in a direction parallel to the turntable axis is essential for the establishment of the driving engagement of the drive pin in the eccentric slot in the disk hub.

Although well calculated to accomplish the purposes for which it is designed, the drive pin support spring is very complex in shape and rather inconveniently large in size. It is, moreover, difficult to construct the spring so as to assure resilient displacement of the drive pin in the required directions to required degrees.

The spring biased lever approach, on the other hand, proposes to mount the drive pin on a support lever which is pivotally supported on the underside of the turntable and which is biased radially outwardly of the turntable by a wire spring. The support lever itself can be of resilient sheet metal material to permit the displacement of the drive pin in a direction parallel to the axis of the turntable. Such resilient displacement of the drive pin in the two directions, made possible by this prior art device, is very effective for the establishment of the proper driving engagement of the turntable with the disk hub.

I nevertheless object to this spring biased lever approach because of difficulties encountered in assemblage, as the wire spring must be mounted to the pivot of the support lever, and the opposite extremities of the spring must be engaged respectively with the lever and the turntable. The wire spring is also easy of disengagement from the lever in use of the apparatus.

SUMMARY OF THE INVENTION

I have hereby invented how to support the drive pin on the turntable far more simply and reliably than heretofore, without in any way impairing the intended functions of the drive pin.

Briefly, my invention may be summarized as a rotating disk data storage apparatus of the type having a turntable for supporting a data storage disk thereon, a spindle disposed centrally on the turntable for centering engagement in a first opening formed centrally in the disk, and a drive pin disposed eccentrically on the turntable so as to be loosely engaged in a second opening formed eccentrically in the disk, the drive pin being effective to impart the rotation of the turntable to the disk.

More specifically, my invention is directed to a drive pin support mechanism in such a rotating disk data storage apparatus. The drive pin support mechanism comprises support means for supporting the drive pin on the turntable so as to permit the drive pin to travel substantially radially of the turntable within limits, and magnetic means for biasing the drive pin substantially radially outwardly of the turntable in order that the data storage disk may be engaged without looseness by the spindle and the drive pin on the turntable.

In a typical embodiment of my invention the drive pin is mounted on the free end of a support lever which is pin jointed to the underside of the turntable for pivotal movement in a plane parallel to that of the turntable. The magnetic means comprises a member of magnetic material also mounted to the free end of the support lever, and permanent magnet means on the turntable for exerting an attractive force on the magnetic member.

As the permanent magnet means I suggest the use of the permanent magnet rotor of a known disk drive motor. Annular in shape, the permanent magnet rotor is affixed concentrically to the turntable and opposed to fixed motor windings for joint rotation with the turntable. The support lever carrying the drive pin and the magnetic member may be disposed radially inwardly of the annular permanent magnet rotor so that the magnetic member and therefore the drive pin may be magnetically biased radially outwardly of the turntable.

Thus, all that is required by my invention for magnetically biasing the drive pin radially outwardly of the turntable is to permanently mount the magnetic member to the support lever or to the drive pin. There is practically no likelihood of accidental detachment of the magnetic member in use of the data storage apparatus. This drive pin support mechanism is therefore easier of assemblage and more reliable in operation than the prior art device employing a wire spring.

Optionally, the drive pin support lever may be made of resilient sheet metal to permit the displacement of the drive pin in a direction substantially parallel to the axis of the turntable, so that the drive pin may be smoothly inserted in the eccentric opening in the disk. The drive pin support mechanism according to my invention offers an additional advantage in connection with such a resilient drive pin support lever. The magnetic member on the support lever and the permanent magnet rotor of the disk drive motor may be so positioned relative to each other that the drive pin may be additionally magnetically biased into engagement in the eccentric opening in the disk. In this manner the drive pin can rely not only on the resiliency of the support lever but also on the attractive force of the permanent magnet rotor for entering the eccentric opening in the disk.

The above and other features and advantages of my invention and the manner of realizing them will become more apparent, and the invention itself will best be understood, from a study of the following description and appended claims, with reference had to the attached drawings showing a preferred embodiment of my invention.

BRIEF DESCRIPTION OF THE DRAWINGS

FIG. 8 is an enlarged, fragmentary top plan explanatory of the positions of the drive pin and a spindle in the eccentric and central openings in the magnetic disk during the rotation of the turntable with

DESCRIPTION OF THE PREFERRED EMBODIMENT

Figure 1:
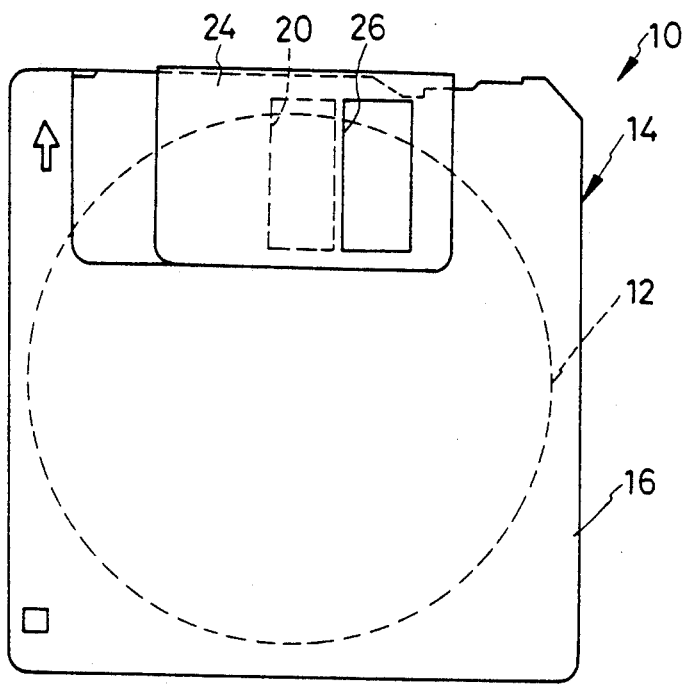
FIG. 1 is a top plan of the known flexible magnetic disk cassette for use with the data storage apparatus of my invention.

I will first briefly describe the flexible magnetic disk cassette of prior art construction for use with the drive pin support mechanism of my invention. Generally designated 10 in FIGS. 1 and 2, the disk cassette has a flexible magnetic disk 12 of three and a half inch diameter rotatably housed in a protective envelope 14 of rigid plastic material. The envelope 14 is of approximately square, rather flat, boxlike shape having a front or top side 16 seen in FIG. 1 and a rear or bottom side 18 seen in FIG. 2.

Formed in both top 16 and bottom 18 sides of the envelope 14, and in the vicinity of one edge thereof, are a pair of apertures 20 and 22 which are in register with each other. These apertures 20 and 22 expose radial portions of the opposite sides of the magnetic disk 12 for data transfer contact with a pair of transducers or read/write heads to be set forth presently.

Normally, the apertures 20 and 22 in the disk envelope 14 are closed by a common sliding shutter 24. This sliding shutter is in the form of a rectangular piece of sheet metal material folded over itself to fit over one edge of the envelope 14. The shutter 24 has itself two apertures 26 and 28 which are out of register with the envelope apertures 20 and 22 when the shutter is held by a spring, not shown, in the normal or right hand position depicted in FIGS. 1 and 2. When the disk cassette 10 is loaded in the associated data storage apparatus or disk drive to be disclosed subsequently, the shutter 24 will be forced to the left against the force of the unshown spring. Thereupon the shutter apertures 26 and 28 will come into register with the envelope apertures 20 and 22 thereby exposing the radial portions of the opposite sides of the disk 12 for data transfer with the data transducers of the data storage apparatus.

The disk cassette 10 is to be placed upon the turntable of the data storage apparatus with the top side 16, FIG. 1, of the disk envelope 14 directed upwardly. Thus, as shown in FIG. 2, the bottom side 18 of the disk envelope 14 has a circular opening 30 cut centrally therein to permit working engagement of the disk 12 with the turntable, as will become apparent from the subsequent description of the data storage apparatus.

Exposed through the opening 30 is a hub 32 in the form of a disk of magnetic sheet metal material attached centrally to the disk 12. The hub 32 has formed therein a central opening 34 of approximately square shape and an eccentric opening 36 of approximately rectangular shape. It will be noted that the eccentric opening or slot 36 is elongated in a direction at an angle to the radial direction of the disk 12. This angular arrangement of the eccentric slot 36 with respect to the square shaped central opening 34 is important for the establishment of the proper working engagement of the disk 12 with the turntable, as will become apparent from the subsequent description of operation.

Figure 2:
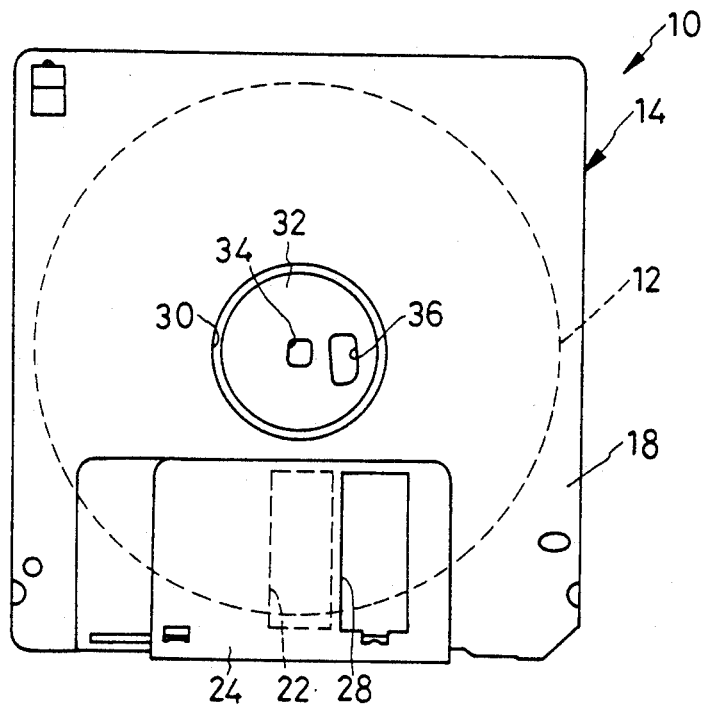
FIG. 2 is a bottom plan of the disk cassette of FIG. 1.
Figure 3:
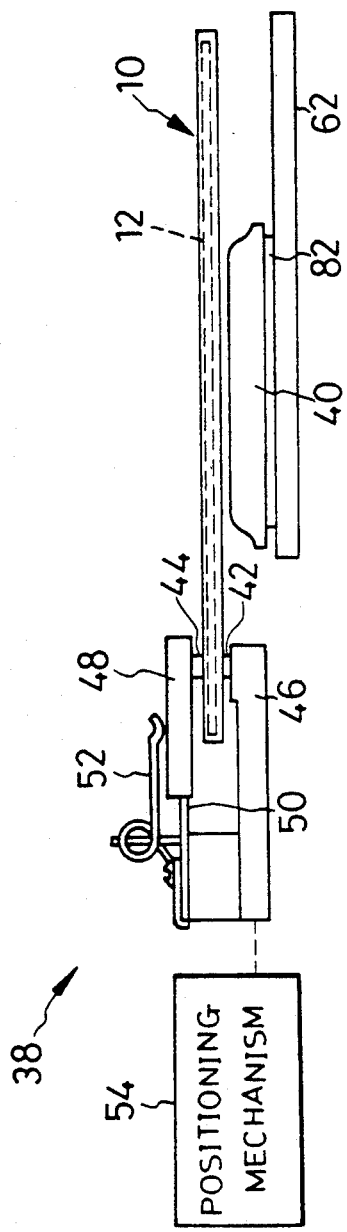
FIG. 3 is a side elevation of part of the data storage apparatus for use with the disk cassette of FIGS. 1 and 2.

I will now refer to FIG. 3 for an inspection of the data storage apparatus 38 for use with the disk cassette 10 of FIGS. 1 and 2. FIG. 3 shows the disk cassette 10 mounted on the turntable 40, so that I understand that the shutter 24 is open. The apparatus 38 has a pair of data transducers 42 and 44 which are now shown to be in data transfer contact with the exposed radial portions of the opposite sides of the disk 12.

The lower transducer 42, for data transfer with the bottom side of the disk 12, is mounted directly on a carriage 46. The upper transducer 44, on the other hand, is mounted to a support beam 48 which in turn is mounted to the carriage 46 via a cantilever spring 50. This spring coacts with a torsion spring 52 to urge the upper transducer 44 against the lower transducer 42 via the disk 12. I understand that the apparatus 38 is provided with a transducer loading mechanism of any known or suitable construction for moving the upper transducer 44 away from the lower 42 when the disk cassette 10 is loaded on and unloaded from the turntable 40.

I have indicated a transducer positioning mechanism by a block 54 because of its conventional and well known nature. The transducer positioning mechanism 54 is coupled to the carriage 46 for moving the transducers 42 and 44 across the concentric annular data tracks on the opposite major surfaces of the disk 12. Typically, the transducer positioning mechanism may comprise an electric bidirectional stepper motor and a motion translating mechanism such as a lead screw for converting the incremental rotation of the stepper motor into the linear, stepwise travel of the carriage 46.

Figure 4:
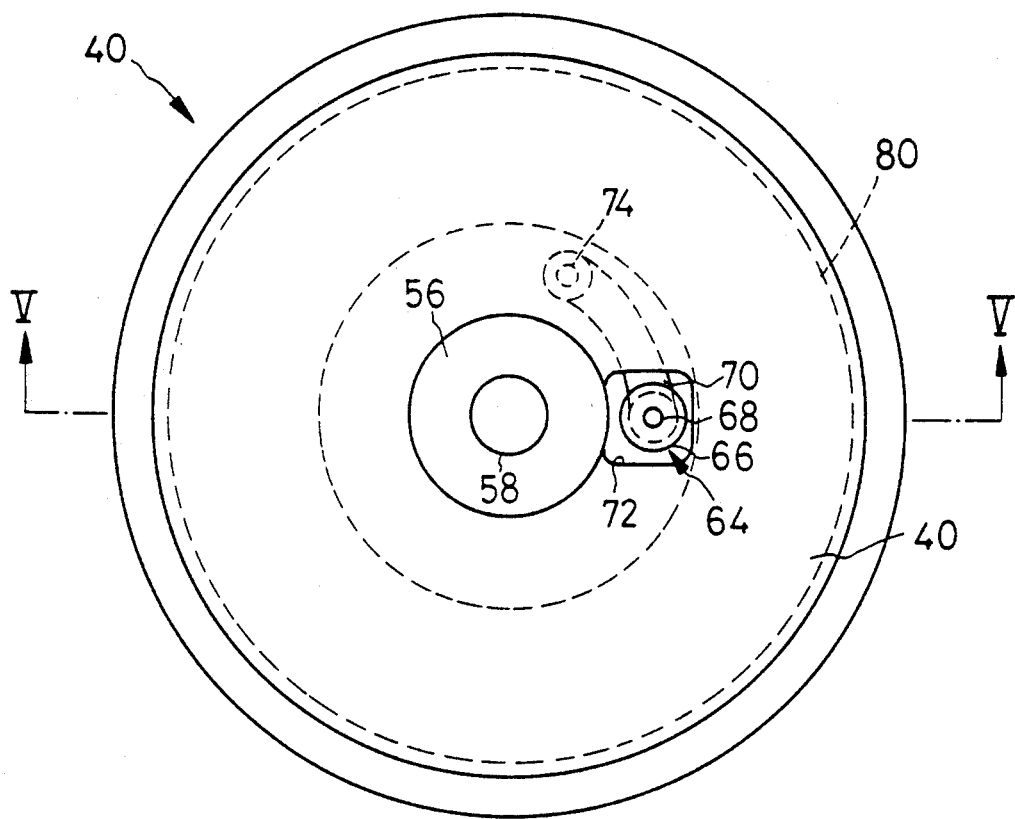
FIG. 4 is an enlarged top plan of the turntable of the data storage apparatus, shown together with the drive pin support mechanism constructed in accordance with my invention.
Figure 5:
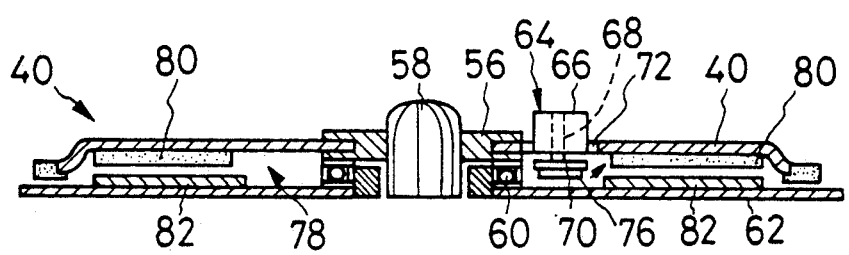
FIG. 5 is an axial section through the turntable, taken along the line V—V in FIG. 4.
Figure 6:
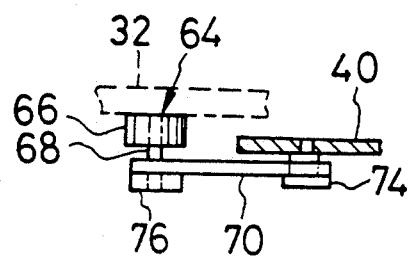
FIG. 6 is a side elevation of the drive pin support mechanism, shown together with part of the turntable which is shown in vertical section.
Figure 7:
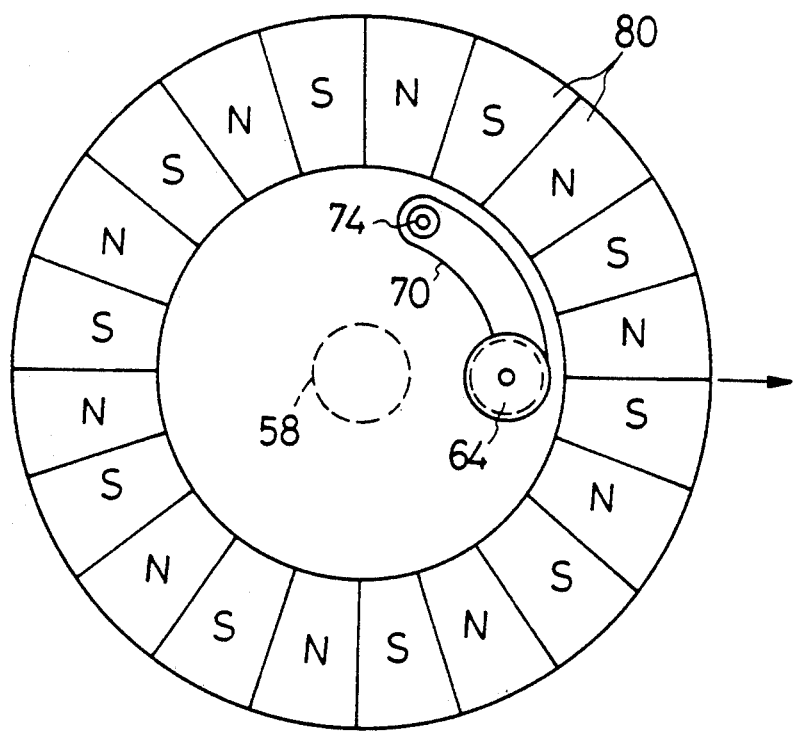
FIG. 7 is a top plan of the permanent magnet rotor of the disk drive motor, shown together with the drive pin support mechanism.

As illustrated in detail FIGS. 4 and 5, the turntable 40 has a permanent magnet hub 56 for attracting the sheet metal hub 32, FIG. 2, of the disk 12. Preferably, the turntable hub 56 may be a molding of a magnetic plastic, that is, a plastic molding containing magnetic particles and permanently magnetized. Annular in shape, the turntable hub 56 is pressfitted over an upstanding spindle 58 which is to be loosely engaged in the central opening 34 in the disk hub 32. The turntable 40 is centrally open and has its inner edge embedded in the peripheral edge of the hub 56 for joint rotation therewith. A bearing 60 is provided on a fixed baseplate 62, which may take the form of a printed circuit board in practice, for rotatably supporting the turntable 40 together with the spindle 58.

At 64 in FIGS. 4–7 is seen a drive pin disposed eccentrically on the turntable 40 for driving engagement in the eccentric opening 36, FIG. 2, in the disk hub 32. Preferably, the drive pin 64 takes the form of a roll 66 rotatably mounted on an upstanding shaft 68 for rolling contact with the disk hub edges bounding the eccentric opening or slot 36. Erected on a distal end of a support lever 70 under the turntable 40, the drive pin 64 extends upwardly therefrom through a clearance hole 72 in the turntable 40. The support lever 70 has its proximal end pivoted at 74 to the underside of the turntable 40 for angular displacement in a plane parallel to hat of the turntable. Thus the drive pin 64 on the free end of the support lever 70 is movable substantially radially of the turntable 40, within the limits set by the clearance hole 72.

FIG. 4 clearly indicates that the support lever 70 is arcuate in shape, centered approximately about the axis of the turntable 40, as seen in a plan view as in this figure. This shape of the support lever 70 is intended for the most efficient transmission of the rotation of the turntable 40 to the magnetic disk 12 via the drive pin 64, in addition to making utmost use of the space available under the turntable.

It has been long believed that the drive pin must be resiliently displaceable relative to the turntable in a direction parallel to the turntable axis for proper driving engagement in the eccentric slot in the disk hub when the disk is loaded on the turntable. Recent study has revealed, however, that the drive pin displacement in that direction is not an absolute necessity. I nevertheless suggest that the support lever 70 be made of somewhat resilient sheet metal material. Therefore, in the illustrated embodiment, the drive pin 64 is movable in a direction substantially parallel to the axis of the turntable 40, besides being movable substantially radially of the turntable.

At 76 is seen a member of magnetic material constituting a feature of my invention. The magnetic member 76 is herein shown as a collar mounted fast on the shaft 68 of the drive pin 64 and disposed under the support lever 70. I will say more about this magnetic member after the following description of a disk drive motor 78 generally designated 78 in FIG. 5.

The disk drive motor 78 is shown as a three phase, eighteen pole, axial gap motor of known construction comprising a permanent magnet rotor 80 and fixed windings 82. As better illustrated in FIG. 7, the rotor 80 is of annular shape, having a series of alternating north and south seeking poles. This annular rotor 80 is affixed to the underside of the turntable 40 in coaxial relationship thereto. Itself made of magnetic material, the turntable 40 serves as a yoke carrying the rotor 80 for joint rotation therewith. The motor windings 82 are immovably mounted on the printed circuit board 62 and opposed to the rotor 80. I understand that the disk drive motor 78 is conventionally provided with three Hall effect elements, not shown, for its phase control, and with additional windings, also not shown, for the detection of its speed.

As will be noted from FIG. 5, the aforesaid magnetic member 76 under the drive pin 64 is disposed radially inwardly of the permanent magnet rotor 80 of the disk drive motor 78 and below the plane of the rotor. Consequently, in the illustrated embodiment, the magnetic member 76 and therefore the drive pin 64 are attracted by the permanent magnetic rotor 80 both upwardly and radially outwardly of the turntable 40. The radially outward magnetic biasing of the drive pin 64 is essential for its proper functioning, and the upward magnetic biasing of the drive pin desirable. The magnetic member 76 may be disposed in coplanar relation to the permanent magnet rotor 80 in cases where the upward magnetic biasing of the drive pin 64 is undesired.

Operation

When the flexible magnetic disk cassette 10 is loaded in the apparatus 38 and the disk 12 placed concentrically on the turntable 40, the spindle 58 will enter the central opening 34 in the disk hub 32. In all likelihood, however, the drive pin 64 will initially be out of register with the eccentric slot 36 in the disk hub 32. In that case, as the permanent magnet hub 56 of the turntable 40 attracts the disk hub 32, the drive pin 64 will be depressed into the turntable 40, provided that the attractive force of the permanent magnet hub is greater than the resultant of the upward biasing of the drive pin 64 by the permanent magnet rotor 80 of the disk drive motor 78 and the force of the support lever 70 resisting the depression of the drive pin.

As the turntable 40 is subsequently set into rotation by the disk drive motor 78, the drive pin 64 will slide under the disk hub 32 and, before one complete revolution of the turntable, come into register with the eccentric slot 36 in the disk hub. Thereupon the drive pin 64 will throw itself into the eccentric slot 36 in the disk hub 32 by virtue of the energy that has been stored in the support lever 70, combined with the upward force exerted on the magnetic member 76 by the permanent magnet rotor 80 of the disk drive motor 78.

Figure 8:
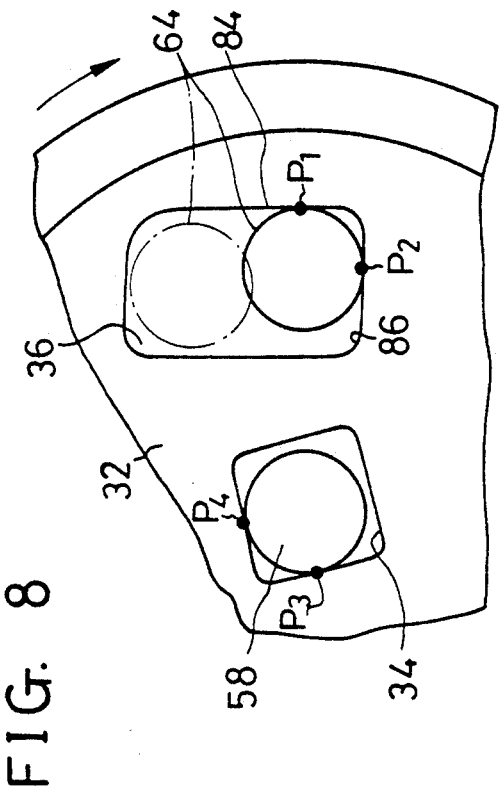

When thus admitted into the eccentric slot 36, the drive pin 64 will initially occupy the position indicated by the phantom outline in FIG. 8. This initial position of the drive pin 64 is at or adjacent the upstream end of the eccentric slot 36 with respect to the arrow marked direction of rotation of the turntable 40. As has been mentioned with reference to FIG. 2, the eccentric slot 36 extends at an angle, rather than right angles, to a line connecting the axis of the disk hub 32 with the geometrical center of the slot. That angle is such that the radially outer edge 84 bounding the slot 36 draws nearer the center of the disk hub 32 as it extends in the direction of rotation of the turntable 40. It should be noted that FIG. 8 is a top plan of the disk hub 32 whereas FIG. 2 is a bottom plan.

Consequently, the distance between the center of the disk hub 32 and the point of contact between drive pin 64 and disk hub edge 84 decreases to a minimum when the drive pin arrives at the solid line position of FIG. 8. The support lever 70 carrying the drive pin 64 will turn in a clockwise direction, as viewed in FIG. 4, about its pivot 74 relative to the turntable 40 in order to make possible such displacement of the drive pin substantially radially inwardly of the turntable. The drive pin 64 when in the solid line position of FIG. 8 contacts not only the radially outer edge 84 of the eccentric slot 36 at a point P₁ but also its downstream edge 86 at a point P₂.

The solid line position of the drive pin 64 is what I call the final drive position. The drive pin 64 when in this final drive position is in proper driving engagement with the slot 36, imparting the rotation of the turntable 40 to the disk 12. The spindle 58, on the other hand, will contact at points P₃ and P₄ the generally square disk hub edges defining the central hole 34 when the drive pin 64 is in the final drive position.

Before arriving at the final drive position, the drive pin 64 will come into contact with the edge 84 of the slot 36 at some point upstream of the point P₁ as the drive pin revolves clockwise, as viewed in FIG. 8, with the turntable 40 after entering the slot 36 in the phantom position. With the continued rotation of the turntable 40 relative to the disk hub 32, the drive pin 66 will roll over the edge 84 of the slot 36 thereby to be gradually forced substantially radially inwardly of the turntable in opposition to the substantially radially outward force being exerted by the permanent magnet rotor 80 of the disk drive motor 78 upon the magnetic member 76. Therefore, in the final drive position, the drive pin 64 will be magnetically maintained in firm contact with the eccentric slot edges at the points P₁ and P₂, and the spindle 58 in firm contact with the central hole edges at the points P₃ and P₄. There will be no looseness whatever between disk hub 32 and turntable 40.

Possible Modifications

Although I have shown and described my invention in terms of but one preferred embodiment thereof, I recognize, of course, that my invention could be embodied in other forms within the broad teaching hereof. The following, then, is a brief list of possible modifications or alterations of the illustrated embodiment which I believe all fall within the scope of my invention:

1. The drive pin 64 could be magnetically biased only in the radially outward direction of the turntable 40, instead of being additionally magnetically biased upwardly of the turntable, as by disposing the magnetic member 76 in coplanar relation to the permanent magnet rotor 80 of the disk drive motor 78.

2. Instead of providing the separate magnetic member 76, as in the form of a collar on the drive pin shaft 68, the support lever 70 could be wholly or partly made of magnetic material, in order for the drive pin 64 to be magnetically biased in a required direction.

3. The drive pin 64 could be supported by means other than the lever 70, all that is required being that the drive pin be resiliently movable substantially radially of the turntable 40.

4. The drive pin 64 could be biased by a devoted magnet, rather than by the permanent magnet rotor 80 of the disk drive motor 78.

5. The rotation of the drive pin 64 about its own axis is not an absolute requirement, so that it could be nonrotatably mounted on the support lever 70 or on any equivalent means.

What I claim is:

1. A rotating disk data storage apparatus having a turntable for supporting a data storage disk thereon, a spindle disposed centrally on the turntable for centering engagement in a first opening formed centrally in the disk, and a drive pin disposed eccentrically on the turntable so as to be loosely engaged in a second opening formed eccentrically in the disk, the drive pin being effective to impart the rotation of the turntable to the disk, wherein the improvement resides in a drive pin support mechanism comprising:

(a) support means for supporting the drive pin on the turntable so as to permit the drive pin to travel substantially radially of the turntable within limits; and (b) magnetic means for biasing the drive pin substantially radially outwardly of the turntable in order that the data storage disk may be engaged without looseness by the spindle and the drive pin on the turntable.

2. The rotating disk data storage apparatus of claim 1 wherein the support means comprises a lever pivotally mounted at one end to the turntable and carrying the drive pin on another end.

3. The rotating disk data storage apparatus of claim 1 the magnetic means comprises:

(a) a magnetic member supported by the support means for joint movement with the drive pin; and (b) permanent magnet means on the turntable for exerting an attractive force on the magnetic member.

4. A rotating disk data storage apparatus having a turntable for supporting a data storage disk for joint rotation therewith about an axis of the turntable, a spindle disposed centrally on the turntable for centering engagement in a first opening formed centrally in the disk, and a drive pin disposed eccentrically on the turntable so as to be loosely engaged in a second opening formed eccentrically in the disk, the drive pin being effective to impart the rotation of the turntable to the disk, wherein the improvement resides in a drive pin support mechanism comprising:

(a) support means for supporting the drive pin on the turntable so as to permit the drive pin to travel both substantially radially of the turntable and in a direction substantially parallel to the axis of the turntable within limits; and (b) magnetic means for biasing the drive pin substantially radially outwardly of the turntable in order that the data storage disk may be engaged without looseness by the spindle and the drive pin on the turntable, the magnetic means additionally biasing the drive pin toward the disk on the turntable in order that the drive pin may be smoothly engaged in the second opening in the disk.

5. The rotating disk data storage apparatus of claim 4 wherein the support means comprises a support lever of resilient material pivotally mounted at one end to the turntable and carrying the drive pin on another end, the support lever being pivotable relative to the turntable to permit the drive pin to travel substantially radially of the turntable and being capable of resilient deflection to permit the drive pin to travel in the direction substantially parallel to the axis of the turntable.

6. The rotating disk data storage apparatus of claim 4 wherein the magnetic means comprises:

(a) a magnetic member supported by the support means for joint movement with the drive pin; and (b) permanent magnet means on the turntable for exerting an attractive force on the magnetic member.

7. A rotating disk data storage apparatus having a turntable for supporting a data storage disk for joint rotation therewith about an axis of the turntable, a spindle disposed centrally on the turntable for centering engagement in a first opening formed centrally in the disk, and a drive pin disposed eccentrically on the turntable so as to be loosely engaged in a second opening formed eccentrically in the disk, the drive pin being effective to impart the rotation of the turntable to the disk, wherein the improvement resides in a drive pin support mechanism comprising:

(a) a support lever having a first end pivotally coupled to the turntable and a second end carrying the drive pin so that the drive pin is movable substantially radially of the turntable with the pivotal movement of the support lever relative to the turntable;

(b) a magnetic member on the second end of the support lever; and (c) permanent magnet means on the turntable exerting an attractive force on the magnetic member for biasing the drive pin substantially radially outwardly of the turntable in order that the data storage disk may be engaged without looseness by the spindle and the drive pin on the turntable.

8. The rotating disk data storage apparatus of claim 7 wherein the support lever is of resilient material permitting the drive pin to travel in a direction substantially parallel to the axis of the turntable, and wherein the relative placement of the magnetic member and the permanent magnet means is such that the drive pin is additionally magnetically biased toward the disk on the turntable in order that the drive pin may be smoothly engaged in the second opening in the disk.

9. A rotating disk data storage apparatus having a turntable for supporting a data storage disk for joint rotation therewith about an axis of the turntable, a spindle disposed centrally on the turntable for centering engagement in a first opening formed centrally in the disk, a drive pin disposed eccentrically on the turntable so as to be loosely engaged in a second opening formed eccentrically in the disk, the drive pin being effective to impart the rotation of the turntable to the disk, and a disk drive motor including a permanent magnet rotor mounted to the turntable, wherein the improvement resides in a drive pin support mechanism comprising:

(a) a support lever having a first end pivotally coupled to the turntable and a second end carrying the drive pin so that the drive pin is movable substantially radially of the turntable with the pivotal movement of the support lever relative to the turntable; and (b) a magnetic member mounted to the second end of the support lever and disposed radially inwardly of the permanent magnet rotor of the disk drive motor;

(c) the permanent magnet rotor of the disk motor exerting an attractive force on the magnetic member for biasing the drive pin substantially radially outwardly of the turntable in order that the data storage disk may be engaged without looseness by the spindle and the drive pin on the turntable.

10. The rotating disk data storage apparatus of claim 9 wherein the support lever is of resilient material permitting the drive pin to travel in a direction substantially parallel to the axis of the turntable, and wherein the relative placement of the magnetic member and the permanent magnet rotor is such that the drive pin is additionally magnetically biased toward the disk on the turntable in order that the drive pin may be smoothly engaged in the second opening in the disk.

11. A rotating disk data storage apparatus having a turntable for supporting a data storage disk for joint rotation therewith in a predetermined direction about an axis of the turntable, a spindle disposed centrally on the turntable for centering engagement in a first opening formed centrally in the disk, a drive pin disposed eccentrically on the turntable so as to be loosely engaged in a second opening formed eccentrically in the disk, the second opening being in the shape of a slot generally extending at an angle to a line joining the axis of the turntable and a geometrical center of the slot, the slot having a first edge which is disposed radially outwardly of the turntable and which draws nearer the axis of the turntable as the first edge extends in the predetermined direction of rotation of the turntable, and a second edge joined to the first edge at a downstream end of the first edge with respect to the predetermined direction of rotation of the turntable, and a disk drive motor having a permanent magnet rotor of annular shape mounted concentrically to the turntable, wherein the improvement resides in a drive pin support mechanism comprising:

(a) a support lever having a first end pivotally coupled to the turntable and a second end carrying the drive pin so that the drive pin is movable substantially radially of the turntable with the pivotal movement of the support lever relative to the turntable; and (b) a magnetic member mounted to the second end of the support lever and disposed radially inwardly of the permanent magnet rotor of the disk drive motor;

(c) the permanent magnet rotor of the disk drive motor exerting an attractive force on the magnetic member for biasing the drive pin substantially radially outwardly of the turntable in order to maintain the drive pin in firm driving engagement with the first and the second edge of the second opening in the disk during the rotation of the turntable.

12. The rotating disk data storage apparatus of claim 11 wherein the support lever is of resilient material permitting the drive pin to travel in a direction substantially parallel to the axis of the turntable, and wherein the relative placement of the magnetic member and the permanent magnet rotor is such that the drive pin is additionally magnetically biased toward the disk on the turntable in order that the drive pin may be smoothly engaged in the second opening in the disk.

* * * * *